United States Patent [19]
Ohkubo et al.

[11] Patent Number: 5,727,851
[45] Date of Patent: Mar. 17, 1998

[54] HYDRAULIC BRAKE APPARATUS

[75] Inventors: Masayasu Ohkubo, Okazaki; Fumiaki Kawahata, Toyota; Masashi Ito, Seto; Kiyoharu Nakamura, Toyota, all of Japan

[73] Assignee: Toyota Jidosha Kabushiki Kaisha, Aichi-ken, Japan

[21] Appl. No.: 733,382

[22] Filed: Oct. 17, 1996

[30] Foreign Application Priority Data

Oct. 17, 1995 [JP] Japan ................................ 7-268666

[51] Int. Cl.$^6$ ........................................ B60T 8/36
[52] U.S. Cl. ........................ 303/117.1; 303/116.1; 303/119.2; 303/DIG. 2
[58] Field of Search .................. 303/117.1, 119.2, 303/119.1, 116.1, 116.2, DIG. 1, DIG. 2; 251/129.15, 129.01, 129.02, 129.03, 129.07, 129.08, 129.22; 137/625.65, 596.17, 625.68

[56] References Cited

U.S. PATENT DOCUMENTS 5,658,057  8/1997  Ohnuma et al. .................. 303/119.2

FOREIGN PATENT DOCUMENTS 7-2088  1/1995  Japan.

Primary Examiner—Douglas C. Butler
Attorney, Agent, or Firm—Kenyon & Kenyon

[57] ABSTRACT

A hydraulic brake apparatus includes a control valve having a spool which is bi-directionally movable between a first position and a second position, the spool, when located at the first position, allowing brake fluid from a low-pressure source to pass through the control valve to a wheel cylinder, and the spool, when located at the second position, allowing brake fluid from a high-pressure source to pass through the control valve to the wheel cylinder. A first unit introduces brake fluid from the wheel cylinder into the control valve, the brake fluid having a wheel cylinder pressure exerted to move the spool in a first direction toward the first position. A second unit introduces brake fluid from a master cylinder into the control valve, the brake fluid having a master cylinder pressure exerted to move the spool in a second, reverse direction toward the second position. A third unit reduces the master cylinder pressure exerted on the spool.

11 Claims, 9 Drawing Sheets

HYDRAULIC BRAKE APPARATUS

BACKGROUND OF THE INVENTION

1. Field of the Invention

The present invention generally relates to a hydraulic brake apparatus, and more particularly to a hydraulic brake apparatus which is appropriate for use in a brake system of an automotive vehicle.

2. Description of the Related Art

Japanese Laid-Open Patent Application No. 7-2088, which is assigned to the assignee of the present invention, teaches a hydraulic brake apparatus which includes a control valve having a spool bi-directionally movable between a first position and a second position, the spool when located at the first position allowing brake fluid from a low-pressure source to pass through the control valve to a wheel cylinder, and the spool when located at the second position allowing brake fluid from a high-pressure source to pass through the control valve to the wheel cylinder.

In the conventional brake apparatus of the above publication, when a master cylinder pressure is increased, the spool in the control valve is moved in a direction from the first position to the second position, increasing a wheel cylinder pressure on the wheel cylinder. After then, the wheel cylinder exerts a force to move the spool in a reverse direction toward the first position as the wheel cylinder pressure is increased.

When the wheel cylinder pressure is greater than the master cylinder pressure multiplied by a given coefficient, the spool is moved in a reverse direction back to an intermediate point between the first position and the second position, stopping the increase of the wheel cylinder pressure. When the master cylinder pressure at this time is reduced, the spool is further moved in the reverse direction to the first position, decreasing the wheel cylinder pressure.

Accordingly, the above brake apparatus is capable of generating a wheel cylinder pressure that is equal to the master cylinder pressure multiplied by the given coefficient in a normal condition.

In the above brake apparatus, a force motor is included which exerts a first driving force on the spool in the same direction as the wheel cylinder pressure and exerts a second driving force on the spool in a second, reverse direction which is the same as that of the master cylinder pressure. The first driving force is exerted by the force motor to move the spool in the first direction toward the first position, reducing a braking force of the wheel cylinder. The braking force of the wheel cylinder at this time is smaller than that of the wheel cylinder when no first driving force is exerted. The second driving force is exerted by the force motor to move the spool in the second, reverse direction toward the second position, increasing the braking force of the wheel cylinder. The braking force of the wheel cylinder at this time is greater than that of the wheel cylinder when no second driving force is exerted.

Generally, a brake system of an automotive vehicle is required to be capable of carrying out an anti-lock brake system (ABS) control and a vehicle stability control (VSC). The ABS control procedure is performed to prevent the locking of the vehicle wheels due to the braking force on the wheels that is excessively high. The VSC procedure is performed to improve the turning characteristics of the vehicle.

In order to accomplish the ABS control and the VSC, it is necessary that the brake apparatus is capable of suitably reducing the wheel cylinder pressure when a brake pedal is depressed and a high master cylinder pressure is generated. In the above-mentioned brake apparatus, the first driving force to move the spool in a reverse direction to the direction of the master cylinder pressure is generated by using the force motor, so that the ABS control and the VSC are accomplished.

Further, the brake system of the vehicle is required to be capable of suitably carrying out a traction control (TRC) and the vehicle stability control (VSC). The TRC procedure is performed to prevent the slippage of the wheels due to the driving force on the wheels that is excessively high.

In order to accomplish the TRC and the VSC, it is necessary that the brake apparatus is capable of suitably increasing the wheel cylinder pressure when the brake pedal is released and the master cylinder pressure is held at the atmospheric pressure. In the above-mentioned brake apparatus, the second driving force to move the spool in the same direction as the direction of the master cylinder pressure is generated by the force motor, so that the TRC and the VSC are accomplished.

Accordingly, the above brake apparatus is capable of generating a wheel cylinder pressure that is equal to the master cylinder pressure multiplied by the given coefficient when the vehicle is operating in the normal condition, and capable of accomplishing the ABS control, the TRC control or the VSC control by suitably controlling the force motor when an operating condition of the vehicle meets one of an ABS control execution condition, a TRC execution condition and a VSC execution condition.

However, it is necessary for the above brake apparatus to use the force motor which generates the driving force on the spool in the first direction as well as the driving force on the spool in the second, reverse direction. The force motor is much more expensive than a solenoid which generates a driving force in one direction only. Therefore, it is difficult for the above brake apparatus to construct a hydraulic brake apparatus having the above-mentioned functions at low cost.

Further, a control procedure performed by the above brake apparatus using the force motor is more complicated than a control procedure performed by a brake apparatus using a solenoid which generates a driving force in one direction only. In the above brake apparatus, the wheel cylinder pressure on the spool is controlled by a resultant force of the driving force due to the master cylinder pressure and the driving force generated by the force motor. The master cylinder pressure serves as a disturbance in this control. Therefore, it is difficult for the above brake apparatus to provide a simple, effective control procedure which accomplishes the above-mentioned functions.

SUMMARY OF THE INVENTION

An object of the present invention is to provide an improved hydraulic brake apparatus in which the above-described problems are eliminated.

Another object of the present invention is to provide a hydraulic brake apparatus which has a simple, inexpensive construction and provides an effective control of the master cylinder pressure on the spool and the wheel cylinder pressure on the spool such that the master cylinder pressure can be reduced when exerting a driving force on the spool to cancel the master cylinder pressure is required.

The above-mentioned objects of the present invention are achieved by a hydraulic brake apparatus which includes: a control valve having a spool which is bi-directionally movable between a first position and a second position, the spool, when located at the first position, allowing brake fluid from a low-pressure source to pass through the control valve to a wheel cylinder, and the spool, when located at the second position, allowing brake fluid from a high-pressure source to pass through the control valve to the wheel cylinder; a first unit which introduces brake fluid from the wheel cylinder into the control valve means, said brake fluid having a wheel cylinder pressure exerted to move the spool in a first direction toward the first position; a second unit which introduces brake fluid from a master cylinder into the control valve, the brake fluid having a master cylinder pressure exerted to move the spool in a second, reverse direction toward the second position; and a third unit which reduces the master cylinder pressure exerted on the spool.

In the hydraulic brake apparatus of the present invention, the first unit includes an outlet port open to the wheel cylinder, and a reaction chamber open the outlet port. The outlet port and the reaction chamber in the first unit are provided within the control valve. The second unit includes an inlet port open to a master cylinder passage, and a master cylinder pressure cavity open to the inlet port. The inlet port and the master cylinder pressure cavity in the second unit are provided within the control valve.

In the hydraulic brake apparatus of the present invention, the third unit inhibits the introduction of brake fluid from the master cylinder into the control valve so that the master cylinder pressure exerted on the spool is reduced.

In the hydraulic brake apparatus of the present invention, it is possible to reduce the master cylinder pressure exerted on the spool. As the master cylinder pressure on the spool is reduced, the spool in the control valve can be moved in the first direction toward the first position even when the pressure at the master cylinder remains high. It is unnecessary to use another source which generates a driving force on the spool in the first direction. Accordingly, the hydraulic brake apparatus of the present invention can provide a simple, inexpensive construction and can provide an effective control of the master cylinder pressure on the spool and the wheel cylinder pressure on the spool in comparison with a conventional brake apparatus which cannot reduce the master cylinder pressure on the spool without using the expensive force motor.

BRIEF DESCRIPTION OF THE DRAWINGS

The above and other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1:
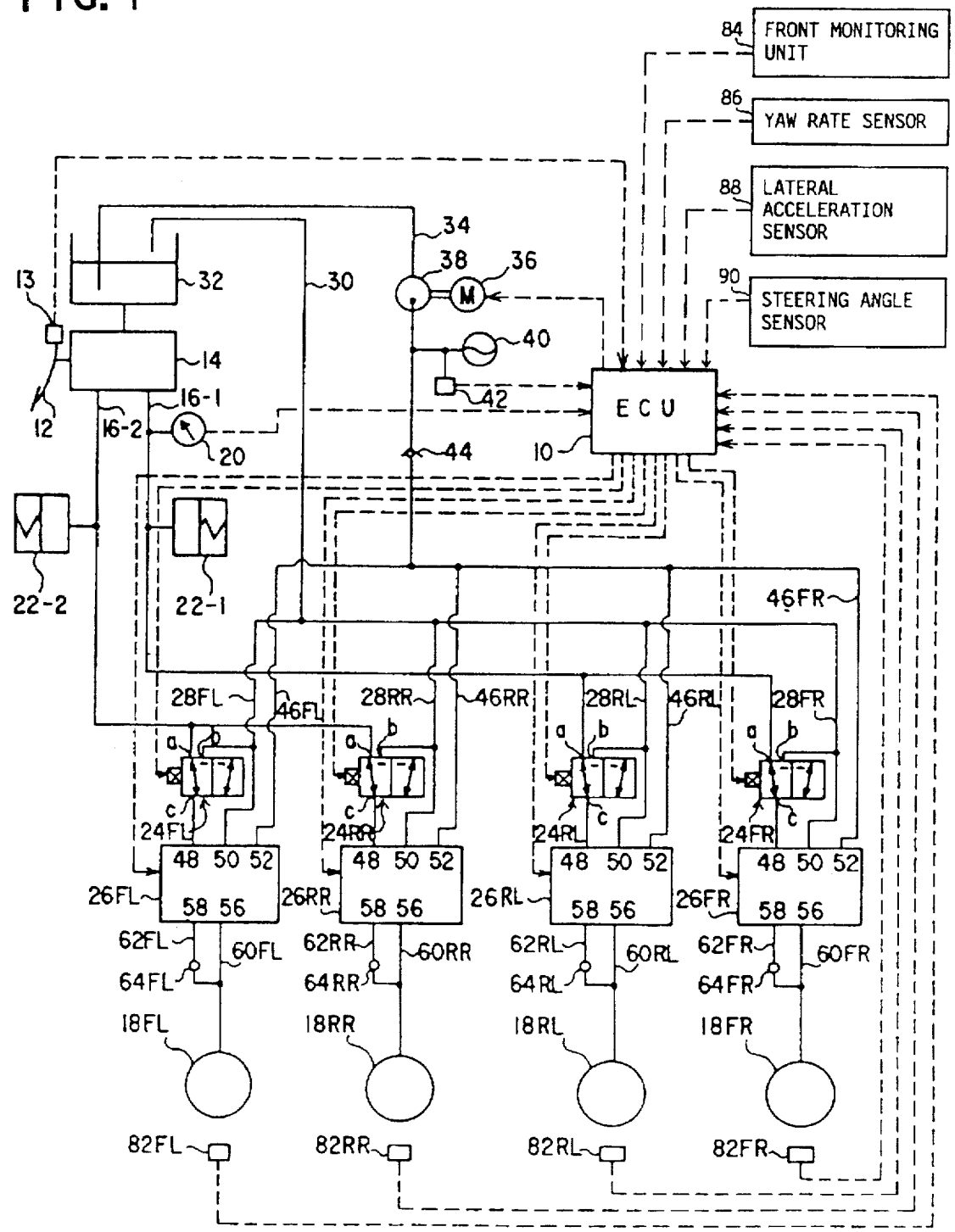
FIG. 1 is a system block diagram of a hydraulic brake apparatus to which one embodiment of the present invention is applied.

FIG. 1 shows a hydraulic brake apparatus to which one embodiment of the present invention is applied. The hydraulic brake apparatus of the present embodiment is controlled by an electronic control unit (ECU) 10 which will be described later.

Referring to FIG. 1, a brake pedal 12 is arranged in a foot space of a driver's seat within an occupant compartment of an automotive vehicle. The brake pedal 12 is connected to a brake switch 13, and this brake switch 13 is connected to an input of the ECU 10. When the brake pedal 12 is depressed by a vehicle driver, the brake switch 13 outputs an ON signal to the ECU 10.

A master cylinder 14 is engaged with the brake pedal 12. The master cylinder 14 is a tandem type in which two brake fluid chambers are provided. A master cylinder passage 16-1 and a master cylinder passage 16-2 are respectively connected to the brake fluid chambers of the master cylinder 14.

The hydraulic brake apparatus of the present embodiment is used in a brake system of a front-engine front-drive vehicle. Four wheel cylinders 18 which are respectively designated by reference numerals 18FL, 18RR, 18RL, and 18FR in FIG. 1 are connected to the master cylinder 14 through the two master cylinder passages 16-1 and 16-2. More specifically, the master cylinder passage 16-1 is connected to each of hydraulic circuits of the wheel cylinders 18FR and 18RL which are provided at front-right and rear-left wheels of the vehicle, and the master cylinder passage 16-2 is connected to each of hydraulic circuits of the wheel cylinders 18FL and 18RR which are provided at front-left and rear-right wheels of the vehicle.

A pressure sensor 20 is provided at an intermediate portion of the master cylinder passage 16-1, and this pressure sensor 20 outputs to the ECU 10 a signal indicative of a pressure of brake fluid included in the master cylinder passage 16-1. The internal pressure of the master cylinder passage 16-1 measured by the pressure sensor 20 is called a master cylinder pressure Pm/c. By receiving the signal from the pressure sensor 20, the ECU 10 detects the master cylinder pressure Pm/c.

A stroke simulator 22-1 and a stroke simulator 22-2 are respectively provided at another portion of the master cylinder passage 16-1 and an intermediate portion of the master cylinder passage 16-2. When the master cylinder pressure Pm/c rises to a high pressure above the atmospheric pressure, the stroke simulators 22-1 and 22-2 draw in a certain amount of brake fluid from the master cylinder passages 16-1 and 16-2 due to the high pressure. When the master cylinder pressure Pm/c is lowered to around the atmospheric pressure, the stroke simulators 22-1 and 22-2 discharge the stored brake fluid to the master cylinder passages 16-1 and 16-2.

Four pressure-reduction solenoids 24 which are designated by reference numerals 24FL, 24RR, 24RL, and 24FR in FIG. 1 are connected to ends of the master cylinder passages 16-1 and 16-2. More specifically, the master cylinder passage 16-1 is connected at the ends thereof to inlet ports "a" of the pressure-reduction solenoids 24FR and 24RL which are provided for the wheel cylinders 18FR and 18RL, and the master cylinder passage 16-2 is connected at the ends thereof to inlet ports "a" of the pressure-reduction solenoids 24FL and 24RR which are provided for the wheel cylinders 18FL and 18RR.

Each of the pressure-reduction solenoids 24 is a three-way solenoid valve having two inlet ports "a" and "b" and an outlet port "c". Each of the pressure-reduction solenoids 24 is operated in response to a drive signal output from the ECU 10. When no drive signal from the ECU 10 is supplied to one of the pressure-reduction solenoids 24, the solenoid 24 passes the brake fluid from the inlet port "a" to the outlet port "c" and closes the inlet port "b". When the drive signal from the ECU 10 is supplied to one of the pressure-reduction solenoids 24, the solenoid 24 passes the brake fluid from the inlet port "b" to the outlet port "c" and closes the inlet port "a".

The outlet ports "c" of the four pressure-reduction solenoids 24 are respectively connected to ports 48 of four control valves 26 which are designated by reference numerals 26FR, 26RL, 26FL, and 26RR in FIG. 1. The control valves 26 will be described in detail later with reference to FIG. 2.

A modification of the present embodiment may be made such that proportioning valves are additionally arranged at intermediate portions of pipe lines between the rear pressure-reduction solenoids 24RR and 24RL and the rear control valves 26RR and 26RL which are provided for the rear-right and rear-left wheels of the vehicle.

The inlet ports "b" of the pressure-reduction solenoids 24 are respectively connected to four low-pressure passages 28 which are designated by reference numerals 28FR, 28RL, 28FL, and 28RR in FIG. 1. The low-pressure passages 28 are connected at other ends to low-pressure ports 50 of the four control valves Further, a reservoir passage 30 is connected to an intermediate portion of the low-pressure passages 28 in common. A reservoir tank 32 is arranged at an upper portion of the master cylinder 14. The reservoir passage 30 is connected at one end to the reservoir tank 32 such that the reservoir passage 30 and the reservoir tank 32 communicate with each other. The brake fluid is contained in the reservoir tank 32, and the reservoir tank 32 has an opening communicating with the atmosphere so that the brake fluid contained in the reservoir tank 32 is always set at the atmospheric pressure.

In addition, a pump passage 34 is connected at one end to the reservoir tank 32. A pump 38 is arranged at an intermediate portion of the pump passage 34, and this pump 38 is driven by a pump actuating motor 36. The pump actuating motor 36 is operated in response to a drive signal output from the ECU 10. When the drive signal from the ECU 10 is supplied to the pump actuating motor 36, the pump 38 is driven by the pump actuating motor 36 so that a discharge pressure of the pump 38 is applied to the brake fluid within the pump passage 34 to control the brake fluid pressure.

Further, an accumulator 40 is provided at another intermediate portion of the pump passage 34. The accumulator 40 collects a given amount of pressurized brake fluid from the pump passage 34 so as to absorb fluctuations of the pressure of the brake fluid in the pump passage 34 which may occur when the pump 38 supplies the pressurized brake fluid at the discharge pressure.

A pressure switch 42 is connected to the accumulator 40. The pressure switch 42 outputs an OFF signal to the ECU 10 when the pressure of the brake fluid in the accumulator 40 is above a first reference value, and it outputs an ON signal to the ECU 10 when the pressure of the brake fluid in the accumulator 40 is below a second, smaller reference value (which is smaller than the first reference value).

When the ON signal from the pressure switch 42 is supplied to the ECU 10, it is determined that the amount of the pressurized brake fluid included in the accumulator 40 is too small. The ECU 10 at this time starts outputting the drive signal to the pump actuating motor 36 so that the pump 38 is driven to apply the discharge pressure to the brake fluid within the pump passage 34. The ECU 10 continues to output the drive signal to the pump actuating motor 36 until the OFF signal from the pressure switch 42 is received.

Further, the pump passage 34 is connected to four high-pressure passages 46 via a check valve 44. The high-pressure passages 46 are designated by reference numerals 46FR, 46RL, 46FL, and 46RR in FIG. 1. The high-pressure passages 46 are connected at other ends to high-pressure ports 52 of the four control valves 26, respectively. Thus, the pressurized brake fluid from the pump 38 is supplied to the control valves 26 through the high-pressure passages 46.

Figure 2:
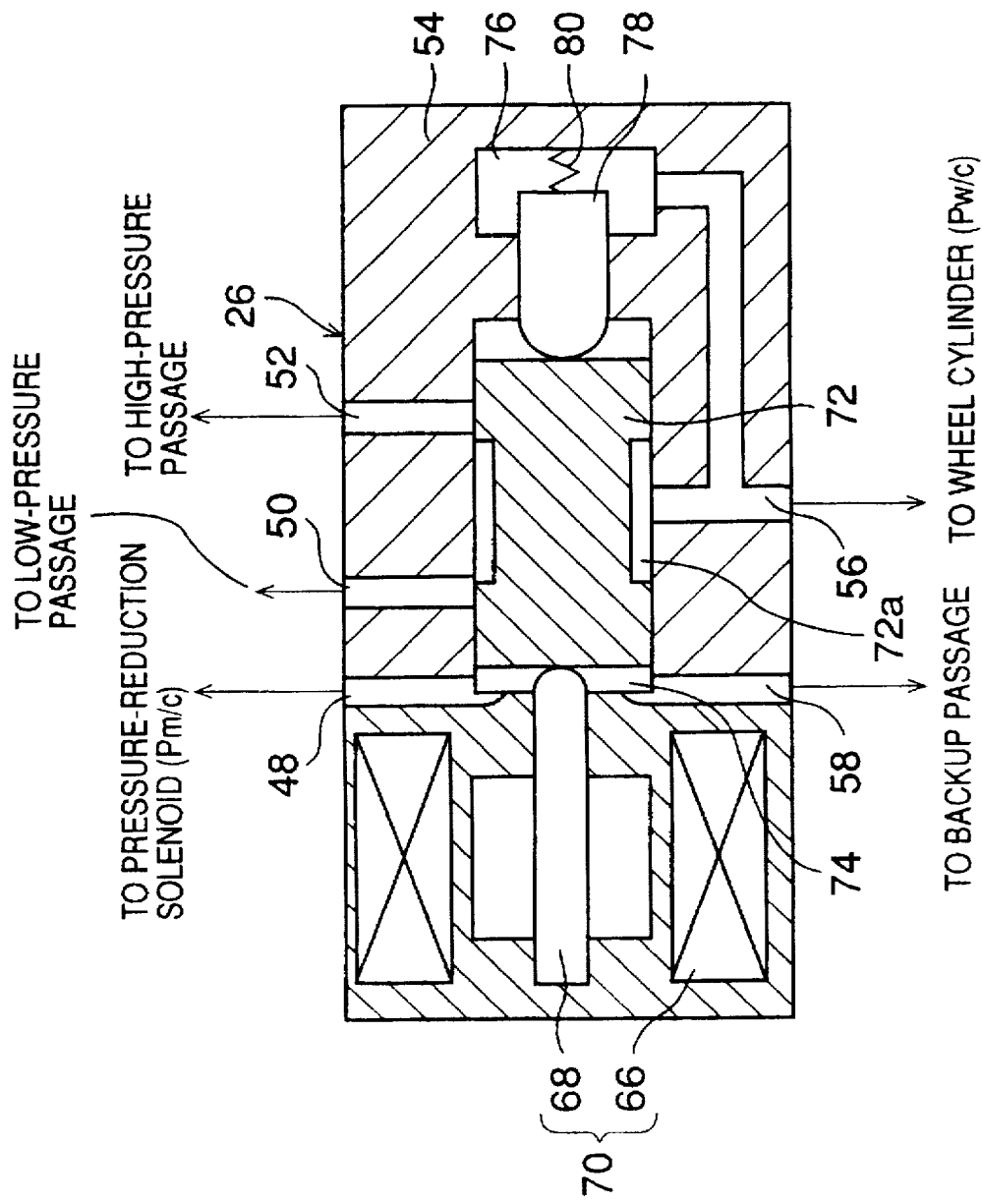
FIG. 2 is a cross-sectional view of a control valve in the hydraulic brake apparatus in FIG. 1.

FIG. 2 shows a control valve 26 in the hydraulic brake apparatus in FIG. 1. The control valve 26 shown in FIG. 2 is representative of one of the control valves 26FL, 26RR, 26RL and 26FR in FIG. 1, for the purpose of convenience.

Referring to FIG. 2, the control valve 26 has a housing 54 which includes: the port 48 connected to the pressure-reduction solenoid 24; the low-pressure port 50 connected to the low-pressure passage 28; and the high-pressure port 52 connected to the high-pressure passage 46. The housing 54 further includes a control pressure outlet port 56 and a master-cylinder-pressure (MCP) outlet port 58.

As shown in FIG. 1, the control pressure outlet ports 56 of the control valves 26 are respectively connected to the wheel cylinders 18 via wheel cylinder passages 60. The wheel cylinder passages 60 are designated by reference numerals 60FL, 60RR, 60RL and 60FR in FIG. 1. The MCP outlet ports 58 are respectively connected to the wheel cylinders 18 via backup passages 62. The backup passages 62 are designated by reference numerals 62FL, 62RR, 62RL and 62FR in FIG. 1.

Further, as shown in FIG. 1, check valves 64 which are designated by reference numerals 64FL, 64RR, 64RL and 64FR in FIG. 1 are arranged at intermediate portions of the backup passages 62, respectively. These check valves 64 permit the brake fluid in the backup passages 62 to flow only in one direction from the MCP outlet ports 58 to the wheel cylinders 18.

Accordingly, the brake fluid in each of the backup passages 62 is allowed to flow in the direction from the MCP outlet port 58 to the wheel cylinder 18 when the pressure of the brake fluid at the MCP outlet port 58 is above a wheel cylinder pressure Pw/c at the wheel cylinder 18. At this time, the wheel cylinder pressure Pw/c is increased by the flow of the brake fluid in the backup passage 62 until it is equal to the pressure of the brake fluid at the MCP outlet port 58.

Referring back to FIG. 2, the control valve 26 includes a linear solenoid 70 which is made up of a solenoid coil 66 and a plunger 68. The plunger 68 is movably supported within the housing 54 so that the plunger 68 is slidable in a longitudinal axial direction of the plunger 68. When electric current flows through the solenoid coil 66, the plunger 68 moves relative to the housing 54 in the longitudinal axial direction to the right on the plane of FIG. 2 due to the electromagnetic force. Thus, when the current is supplied, the linear solenoid 70 generates a driving force on a spool 72 (which will be described later) in one direction only.

As shown in FIG. 2, the control valve 26 includes the spool 72 arranged adjacent to one end of the plunger 68 and movably supported in the housing 54. The spool 72 is a generally cylindrical member with a longitudinal axis which extends in a horizontal direction. Similarly to the plunger 68, the spool 72 is movably supported in the housing 54 so that the spool 72 is slidable in the longitudinal axial direction. An annular groove 72a is formed on a peripheral surface of the spool 72 in the middle of its width along the longitudinal axis.

A master-cylinder-pressure (MCP) cavity 74 is internally formed in the housing 54 around an end surface of the spool 72 to which the plunger 68 is connected. The MCP cavity 74 always communicates with both the port 48 and the MCP outlet port 58. The pressure of brake fluid at the port 48, the pressure of brake fluid at the MCP outlet port 58, and the pressure of brake fluid in the MCP cavity 74 are always equal to each other, regardless of whether the spool 72 moves to the right or to the left on the plane of FIG. 2. When the brake fluid at the port 48 is subjected to an increased master cylinder pressure Pm/c which is above the atmospheric pressure, a driving force to move the spool 72 in the longitudinal axial direction to the right is exerted on the spool 72.

When the spool 72 in the control valve 26 in FIG. 2 is located in a range from a left-end position to a first mid-position along the longitudinal axis thereof, brake fluid from the low-pressure passage 28 at the low-pressure port 50 is allowed to pass through the control valve 26 (the groove 72a) to the corresponding wheel cylinder 18 via the control pressure outlet port 56. The high-pressure port 52 is closed by the spool 72 at this time. The brake fluid at the outlet port 56 is subjected to the low pressure of the brake fluid from the low-pressure passage 28 at the port 50. The position of the spool 72 in the control valve 26 which produces the above-mentioned condition is called a first position of the spool 72.

When the spool 72 in the control valve 26 is located in a range from a second mid-position to a right-end position along the longitudinal axis, brake fluid from the high-pressure passage 46 at the high-pressure port 52 is allowed to pass through the control valve 26 (the groove 72a) to the corresponding wheel cylinder 18 via the control pressure outlet port 56. The low-pressure port 50 is closed by the spool 73 at this time. The brake fluid at the outlet port 56 is subjected to the high pressure of the brake fluid from the high-pressure passage 46 at the port 52. The position of the spool 72 in the control valve 26 which produces the above-mentioned condition is called a second position of the spool 72.

Further, when the spool 72 in the control valve 26 is located in an intermediate range between the first mid-position and the second mid-position, both the low-pressure port 50 and the high-pressure port 52 are closed by the spool 72. The brake fluid at the outlet port 56 is isolated from the low pressure of brake fluid in the low-pressure passage 28 as well as the high pressure of brake fluid in the high-pressure passage 46. The position of the spool 72 in the control valve which produces the above-mentioned condition is called a holding position of the spool 72.

The housing 54 of the control valve 26 in FIG. 2 includes a reaction chamber 76 which is open to the control pressure outlet port 56. A reaction pin 78 is arranged adjacent to the other end surface of the spool 72. The reaction pin 78 is movable in a longitudinal axial direction and supported by the internal wall of the housing 54. A spring 80 which provides a biasing force to push the reaction pin 78 toward the spool 72 is arranged within the reaction chamber 76. One end of the reaction pin 78 internally projects to the inside of the reaction chamber 76, and the other end of the reaction pin 78 is brought into contact with the spool 72 by the spring 80.

When brake fluid from the corresponding wheel cylinder 18 is introduced from the port 56 into the reaction chamber 76, the biasing force of the spring 80 and a reaction force due to the wheel cylinder pressure Pw/c are exerted on the reaction pin 78 both to move the spool 72 in the longitudinal axial direction to the left on the plane of FIG. 2. In the following, the influence by the biasing force of the spring 80 on the spool 72 will be disregarded since the magnitude of the biasing force of the spring 80 relative to the magnitude of the reaction force is small enough to disregard it.

Generally, in the control valve 26 in FIG. 2, either a driving force Fm/c due to the master cylinder pressure Pm/c in the cavity 74 or a driving force Fp due to the actuating force of the solenoid 70 is exerted on the spool 72 so as to move the spool 72 in the second direction toward the second position (to the right on the plane of FIG. 2). Further, a reaction force Fw/c due to the wheel cylinder pressure Pw/c in the reaction chamber 76 is exerted on the spool 72 so as to move the spool 72 in the first direction toward the first position (to the left on the plane of FIG. 2).

Suppose that the spool 72 has a cross-sectional area As which is effective to transmit the master cylinder pressure Pm/c. The driving force Fm/c due to the master cylinder pressure Pm/c is represented by the equation: Fm/c=As·Pm/c. Suppose that the reaction pin 78 has a cross-sectional area Ar which is effective to transmit the wheel cylinder pressure Pw/c. The reaction force Fw/c due to the wheel cylinder pressure Pw/c is represented by the equation: Fw/c=Ar·Pw/c.

When the condition: Fm/c>Fw/c is met and the driving force Fp due to the actuating force of the solenoid 70 is zero, the spool 72 in the control valve 26 is moved in the second direction toward the second position (to the right on the plane of FIG. 2). As a result of the movement of the spool 72, the wheel cylinder pressure Pw/c is increased, and finally the condition: Fm/c=Fw/c will be met.

On the other hand, when the condition: Fm/c<Fw/c is met and the driving force Fp due to the actuating force of the solenoid 79 is zero, the spool 72 in the control valve 26 is moved in the first direction toward the first position (to the left on the plane of FIG. 2). As a result of the movement of the spool 72, the wheel cylinder pressure Pw/c is reduced, and finally the condition: Fm/c=Fw/c will be met.

Accordingly, in the hydraulic brake apparatus of the present embodiment, when the driving force Fp due to the actuating force of the solenoid 70 is zero, the position of the spool 72 in the control valve 26 is always adjusted so as to finally meet the condition: Fm/c=Fw/c. In this case, the following relationship between the master cylinder pressure Pm/c and the wheel cylinder pressure Pw/c is met:

$$Pw/c=(As/Ar)\cdot Pm/c \tag{1}$$

where (As/Ar) is a given coefficient.

In the hydraulic brake apparatus of the present embodiment, the brake fluid at the port 48 of the control valve 26 is subjected to the master cylinder pressure Pm/c and the driving force Fp due to the actuating force of the solenoid 70 is set at zero. By placing the control valve 26 in this condition, the hydraulic brake apparatus of the present embodiment is capable of generating a wheel cylinder pressure Pw/c at the outlet port 56, which is controlled at a value represented by the above Equation (1).

In addition, in the hydraulic brake apparatus of the present embodiment, in a case in which the master cylinder pressure Pm/c on the spool 72 is zero, the driving force Fp exerted to move the spool 72 in the second direction is generated by supplying electric current to the solenoid 70. When the condition: Fp>Fw/c is met and the master cylinder pressure Pm/c on the spool 72 is zero, the spool 72 in the control valve 26 is moved in the second direction toward the second position (to the right on the plane of FIG. 2). As a result of the movement of the spool 72, the wheel cylinder pressure Pw/c is increased, and finally the condition: Fp=Fw/c will be met. On the other hand, when the condition: Fp<Fw/c is met and the master cylinder pressure Pm/c on the spool 72 is zero, the spool 72 in the control valve 26 is moved in the first direction toward the first position (to the left on the plane of FIG. 2). As a result of the movement of the spool 72, the wheel cylinder pressure Pw/c is reduced, and finally the condition: Fp=Fw/c will be met.

Accordingly, in the hydraulic brake apparatus of the present embodiment, in the case in which the master cylinder pressure Pm/c on the spool 72 is zero, the position of the spool 72 in the control valve 26 is adjusted by using the solenoid 70 so as to finally meet the condition: Fp=Fw/c. In this case, the following relationship between the driving force Fp and the wheel cylinder pressure Pw/c is met:

$$Pw/c = (1/Ar) \cdot Fp \qquad (2)$$

where 1/Ar is a given coefficient.

Referring back to FIG. 1, four wheel speed sensors 82 which are designated by reference numerals 82FL, 82RR, 82RR and 82FR in FIG. 1 are connected to inputs of the ECU 10. Each of the wheel speed sensors 82 outputs to the ECU 10 a signal indicative of a wheel speed Vw of the corresponding wheel of the vehicle. By receiving the signals from the wheel speed sensors 82, the ECU 10 is capable of generating an estimated vehicle speed VS0 of the vehicle. Also, the ECU 10 is capable of generating a slip ratio S of each of the vehicle wheels, based on the estimated vehicle speed VS0 and the wheel speeds Vw indicated by the signals from the wheel speed sensors 82.

Generally, when the vehicle is braked, the wheel speeds Vw are smaller than the vehicle speed VS0, which causes a slip ratio S to be produced. In the following, the slip ratio produced when the vehicle is braked is represented by "Sbrk". On the other hand, when the vehicle is accelerating, the wheel speeds Vw are greater than the vehicle speed VS0, which causes a slip ratio S to be produced. In the following, the slip ratio produced when the vehicle is accelerating is represented by "Sacc".

In the hydraulic brake apparatus, as shown in FIG. 1, a front monitoring unit 84, a yaw rate sensor 86, a lateral acceleration sensor 88, and a steering angle sensor 90 are connected to inputs of the ECU 10.

The front monitoring unit 84 monitors an obstacle or an advancing vehicle in a forward direction of the vehicle. The front monitoring unit 84 is made up of a radar device or a CCD (charge-coupled device) camera. The front monitoring unit 84 outputs to the ECU 10 a signal indicative of a result of the monitoring in the forward direction of the vehicle. By receiving the signal from the front monitoring unit 84, the ECU 10 is capable of detecting the presence of an obstacle or an advancing vehicle, detecting a relative distance of the obstacle or the advancing vehicle, and detecting a relative velocity of the obstacle or the advancing vehicle.

The yaw rate sensor 86 generates a signal indicative of a yaw velocity of the vehicle around a vertical axis passing through its center of gravity and a direction of the yaw velocity. The lateral acceleration sensor 88 generates a signal indicative of a lateral acceleration of the vehicle in a lateral direction perpendicular to a forward running direction of the vehicle, and a direction of the lateral acceleration. By receiving the signals from the yaw rate sensor 86 and the lateral acceleration sensor 88, the ECU 10 is capable of detecting a state of turning of the vehicle and a direction of the turning of the vehicle.

The steering angle sensor 90 generates a signal indicative of a steering angle of the vehicle. By receiving the signal from the steering angle sensor 90, the ECU 10 is capable of detecting the steering angle of the vehicle.

The ECU 10 of the hydraulic brake apparatus in FIG. 1 detects an operating condition of the vehicle based on the signals output from the above-mentioned sensors. The ECU 10 controls the pressure-reduction solenoids 24 and the solenoids 70 of the control valves 26 in accordance with the detected operating condition of the vehicle. Therefore, the hydraulic brake apparatus of the present embodiment is capable of generating a wheel cylinder pressure that is equal to the master cylinder pressure multiplied by the given coefficient when the vehicle is operating in a normal condition. Further, the hydraulic brake apparatus of the present embodiment is capable of accomplishing the ABS control, the TRC control, the VSC control or an automatic braking control, when an operating condition of the vehicle meets any of an ABS control execution condition, a TRC execution condition, a VSC execution condition and an automatic braking control execution condition.

When none of the ABS control execution condition, the TRC execution condition, the VSC execution condition and the automatic braking control execution condition is met, the ECU 10 does not supply drive signals to the pressure-reduction solenoids 24 nor to the solenoids 70 of the control valves 26. At this time, since the brake fluid at the port 48 of each control valve 26 is subjected to the master cylinder pressure Pm/c and the driving force Fp due to the actuating force of each solenoid 70 is set at zero, the hydraulic brake apparatus of the present embodiment generates a wheel cylinder pressure that is equal to the master cylinder pressure multiplied by the given coefficient.

Figure 3:
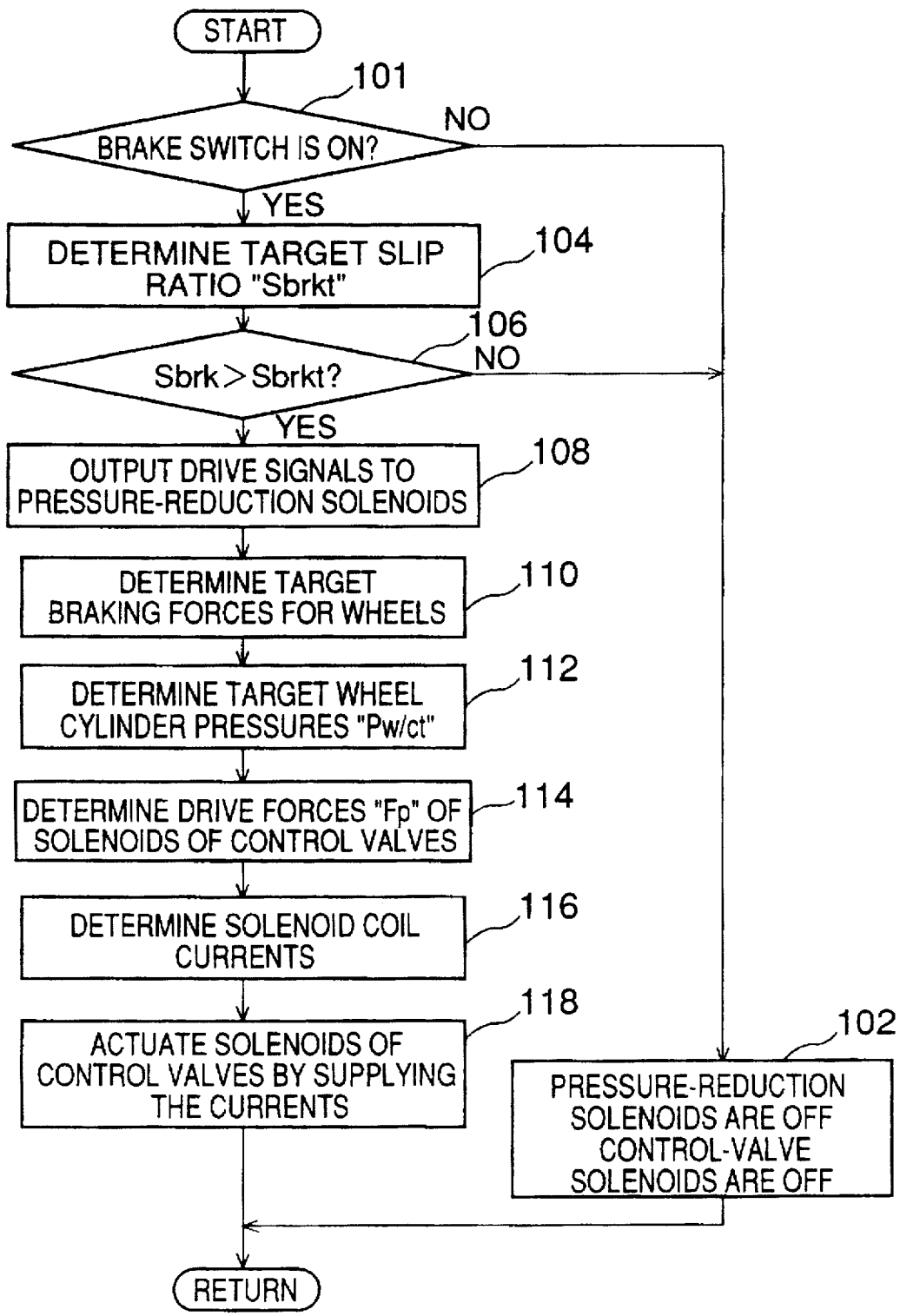
FIG. 3 is a flowchart for explaining an anti-lock brake system (ABS) control routine executed by an electronic control unit in FIG. 1.

FIG. 3 shows an anti-lock brake system (ABS) control routine executed by the ECU 10 of the hydraulic brake apparatus in FIG. 1. The execution of the control routine in FIG. 3 is repeatedly started at intervals of a predetermined time by using periodic interrupts.

When the ABS control routine in FIG. 3 is started, the ECU 10 at step 101 detects whether an ON signal is output by the brake switch 13 to the ECU 10.

When the result at the step 101 is negative, it is determined that the brake pedal 12 is released by the vehicle operator. Step 102 sets the pressure-reduction solenoids 24 in OFF state and sets the control-valve solenoids 70 in OFF state. The ECU 10 at this time does not supply drive signals to the pressure-reduction solenoids 24 nor to the solenoids 70 of the control valves 26. After the step 102 is performed, the control routine at the present cycle ends.

On the other hand, when the result at the step 101 is affirmative, it is determined that the brake pedal 12 is depressed by the vehicle operator. Step 104 determines a target slip ratio "Sbrkt" of the wheels based on the estimated vehicle speed VS0 (which is generated in another control routine) and the wheel speeds Vw (indicated by the signals from the wheel speed sensors 82). The target slip ratio "Sbrkt" generated at the step 104 is a maximum slip ratio that can maintain appropriate grip conditions of the tires of the vehicle when braked.

After the step 104 is performed, step 106 detects whether the slip ratio "Sbrk" of each wheel is greater than the target slip ratio "Sbrkt".

When the result at the step 106 is negative (Sbrk≦Sbrkt), it is determined that the grip condition of each tire does not exceed its critical level. At this time, the above step 102 is performed, and then the control routine at the present cycle ends.

When the result at the step 106 is affirmative (Sbrk>Sbrkt), it is determined that the grip conditions of any of the tires exceed the critical level. The ECU 10 at this time determines that the present operating condition of the vehicle meets the ABS control execution condition, and the control is next transferred to step 108.

Step 108 outputs the drive signals to the pressure-reduction solenoids 24. As the actuation of the pressure-reduction solenoids 24 is performed, the master cylinder passages 16-1 and 16-2 are isolated from the control valves 26 and the flow of brake fluid from the master cylinder 14 into the control valves 26 is inhibited.

At this time, the pressure-reduction solenoids 24 inhibit flowing out of brake fluid from the master cylinder 14 to the low-pressure passages 28 leading to the reservoir tank 32, simultaneously when the master cylinder pressure Pm/c exerted on the spool 72 is reduced. In the present embodiment, the stroke simulators 22-1 and 22-2 are connected to the intermediate portions of the master cylinder passages 16-1 and 16-2. Thus, even when the flow of brake fluid from the master cylinder 14 into the control valves 26 is inhibited, a certain stroke amount of the brake pedal 12 is permitted.

In addition, a change in the master cylinder pressure Pm/c in response to a change in the displacement of the brake pedal 12 when depressed is detected by the ECU 10 by receiving the signal output from the pressure sensor 20.

Further, when the actuation of the pressure-reduction solenoids 24 is performed at the step 108, the brake fluid at the ports 48 of the control valves 26 is allowed to flow through the pressure-reduction solenoids 24 into the low-pressure passages 28. At this time, the master cylinder pressure Pm/c exerted on the spool 72 of each control valve 26 is set at zero (which is equal to the atmospheric pressure). Thus, after the step 108 is performed, the position of the spool 72 in each control valve 26 is adjusted by using the solenoid 70, and the wheel cylinder pressure Pw/c at each wheel cylinder 18 is controlled by the driving force Fp by the solenoid 70 of a corresponding control valve 26 connected to the wheel cylinder 18. The relationship between the driving force Fp and the wheel cylinder pressure Pw/c is defined by the above Equation (2).

After the step 108 is performed, step 110 determines target braking forces for the wheels. Each of the target braking forces is generated at the step 110 based on the detected master cylinder pressure Pm/c (indicated by the signal from the pressure sensor 20) and a difference between the target slip ratio Sbrkt and the slip ratio Sbrk of the corresponding wheel. The target braking forces generated at the step 110 are values that can maintain appropriate grip conditions of the tires and suit to a desired braking performance.

After the step 110 is performed, step 112 determines target wheel cylinder pressures "Pw/ct" for the wheel cylinders 18 based on the target braking forces at the step 110. The target wheel cylinder pressures Pw/ct generated at the step 112 are values that make the wheel cylinder pressure Pw/c applied to the wheel cylinders 18 appropriate for the target braking forces of the wheels.

After the step 112 is performed, step 114 determines driving forces "Fp" for the solenoids 70 of the control valves 26 based on the target wheel cylinder pressures Pw/ct for all the wheel cylinders 18, in accordance with the above Equation (2).

After the step 114 is performed, step 116 determines electric currents "I" which are supplied to the solenoid coils 66 of the solenoids 70 in order to produce the driving forces "Fp" at the solenoids 70.

After the step 116 is performed, step 118 actuates the solenoids 70 of the control valves 26 by supplying the current I to the corresponding solenoid coil 66 of each solenoid 70. The control valves 26 are controlled by the ECU 10 at the step 118 so that the control valves 26 are in appropriate conditions. After the step 118 is performed, the control routine at the present cycle ends.

In the above-described embodiment, when the ABS control execution condition is met, the master cylinder pressure Pm/c on the spool 72 is set at zero, and the driving force Fm/c due to the master cylinder pressure Pm/c is also set at zero. At this time, for example, if the driving force Fp due to the actuating force of the solenoid 70 of the control valve 26 is adjusted to zero, it is possible to move the spool 72 in the second direction to the second position (or the left-end position of the spool 12 in the control valve 26).

Accordingly, it is possible for the hydraulic brake apparatus of the present embodiment to generate any wheel cylinder pressure, required during the ABS control, by actuating the control valves 26 having the linear solenoid 70 which generates the driving force Fp on the spool 72 in one direction only.

In the above-described embodiment, the master cylinder pressure Pm/c on the spool 72 can be reduced, and the spool 72 in the control valve 26 can be moved in the first direction toward the first position even when the pressure at the master cylinder 14 remains high. Accordingly, the hydraulic brake apparatus of the present embodiment can provide a simple, inexpensive construction and provides an effective control of the master cylinder pressure on the spool and the wheel cylinder pressure on the spool in comparison with a conventional brake apparatus which cannot reduce the master cylinder pressure on the spool without using the expensive force motor.

Further, in the above-described embodiment, the solenoid coil currents I are determined through the steps 112–116 based on the target braking forces generated at the step 110. However, the present invention is not limited to the present embodiment. For example, a modification of the present embodiment may be made such that the solenoid coil currents I are directly determined from the target braking forces by using a map.

Figure 4:
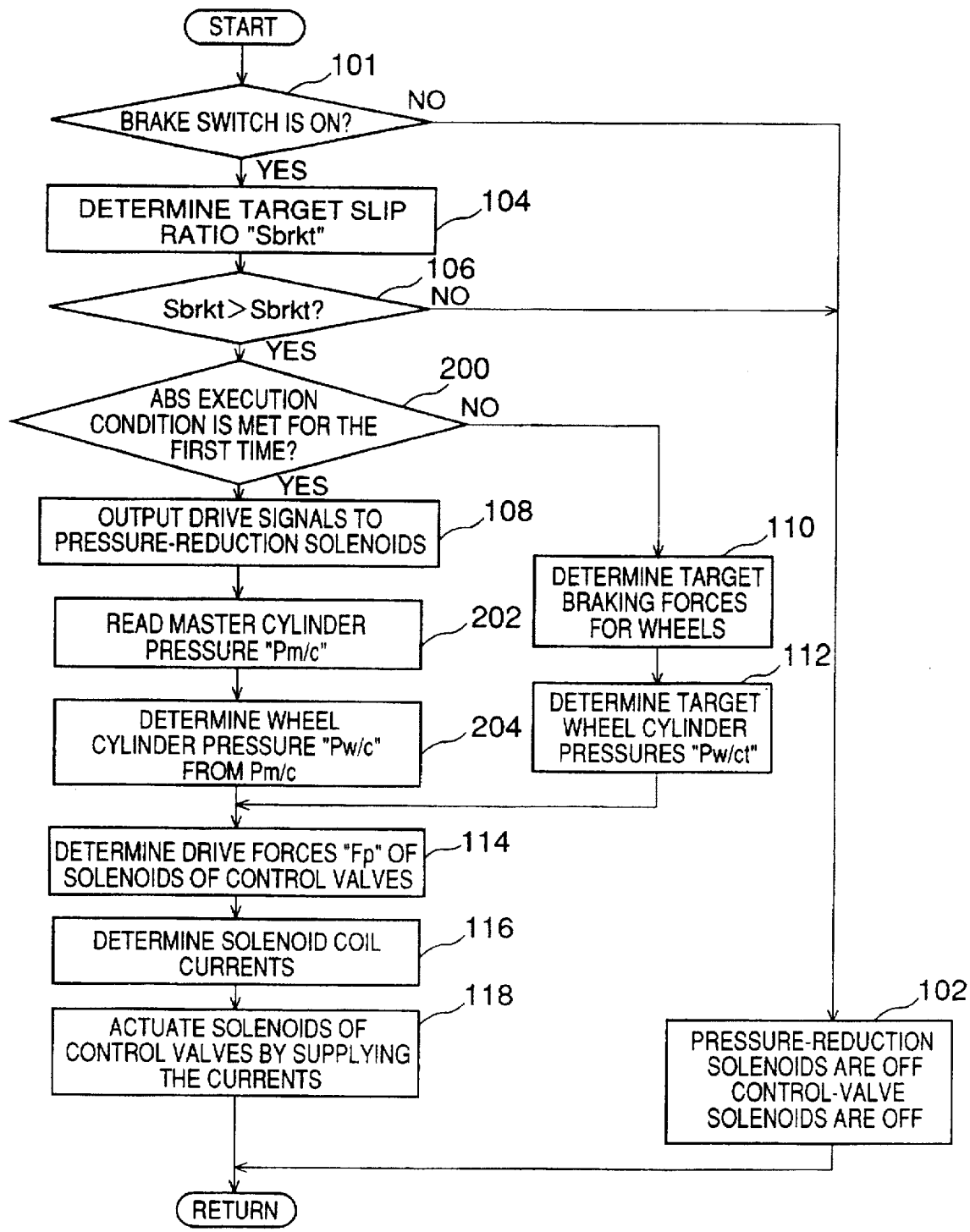
FIG. 4 is a flowchart for explaining another anti-lock brake system (ABS) control routine executed by the electronic control unit in FIG. 1.

FIG. 4 shows another anti-lock brake system (ABS) control routine executed by the ECU 10 of the hydraulic brake apparatus in FIG. 1.

Similarly to the control routine in FIG. 3, the execution of the control routine in FIG. 4 is repeatedly started at intervals of a predetermined time by using periodic interrupts. In FIG. 4, the steps which are the same as corresponding steps of the ABS control routine in FIG. 3 are designated by the same reference numerals, and a description thereof will be omitted.

In the ABS control routine in FIG. 4, when the ABS control execution condition is met, the driving force Fm/c due to the master cylinder pressure Pm/c on the spool 72 is set at zero, and by applying the driving force Fp due to the actuating force of the solenoid 70 of each control valve 26, the ABS control is accomplished.

Referring to FIG. 4, when the result at the step 106 is affirmative (Sbrk>Sbrkt), it is determined that the grip conditions of any of the tires exceed the critical level. At this time, the ECU 10 determines that the operating condition of the vehicle meets the ABS control execution condition, and the control is next transferred to step 200.

Step 200 detects whether the ABS control execution condition (Sbrk>Sbrkt) is met for the first time at the present cycle. If the ABS control execution condition is not met for the first time, the ABS control execution condition continues to be met at the present cycle after the ABS control execution condition is already met at the previous cycle.

When the result at the step 200 is negative, it is determined that the ABS control execution condition is already met at the previous cycle. At this time, similarly to the control routine in FIG. 3, the steps 110 through 118 are performed, and then the control routine in FIG. 4 at the present cycle ends.

When the result at the step 200 is affirmative, it is determined that the ABS control execution condition is met for the first time at the present cycle. At this time, the control is next transferred to step 108. Step 108 outputs the drive signals to the pressure-reduction solenoids 24. After the step 108 is performed, step 202 is performed.

Step 202 reads out the master cylinder pressure Pm/c indicated by the signal from the pressure sensor 20. After the step 202 is performed, step 204 determines a wheel cylinder pressure Pw/c based on the read-out master cylinder pressure Pm/c in accordance with the above Equation (1). The wheel cylinder pressure Pw/c generated at the step 204 is considered a new target wheel cylinder pressure Pw/ct. In order to realize the new target wheel cylinder pressure Pw/ct, after the step 204 is performed, the steps 114 through 118 are performed. After then, the control routine at the present cycle ends.

In the ABS control routine in FIG. 4, when the ABS control execution condition is met for the first time, the driving force exerted on the spool 72 is changed from the driving force Fm/c to the driving force Fp. At this time, the slip ratio Sbrk of any of the wheels has just been greater than the target slip ratio Sbrkt. Strictly speaking, when the slip ratio Sbrk of each wheel is equal to the target slip ration Sbrkt, the hydraulic brake apparatus can carry out the most effective control of the wheel cylinder pressure Pw/c.

In the above-described control routine, the wheel cylinder pressure Pw/c of each wheel cylinder 18, which will be used immediately after the ABS control is started, is set at the wheel cylinder pressure Pw/ct generated when the ABS control execution condition is met for the first time. Therefore, the present embodiment provides a very effective ABS control of the wheel cylinder pressure on the spool while appropriate grip conditions of the tires are maintained. The ABS control routine in FIG. 4 can provide a more effective ABS control than that of the ABS control routine in FIG. 3, since, in the ABS control routine in FIG. 3, the solenoid coil currents I are determined based merely on the difference between the slip ratio Sbrk and the target slip ratio Sbrkt when the ABS control execution condition is met.

Figure 5:
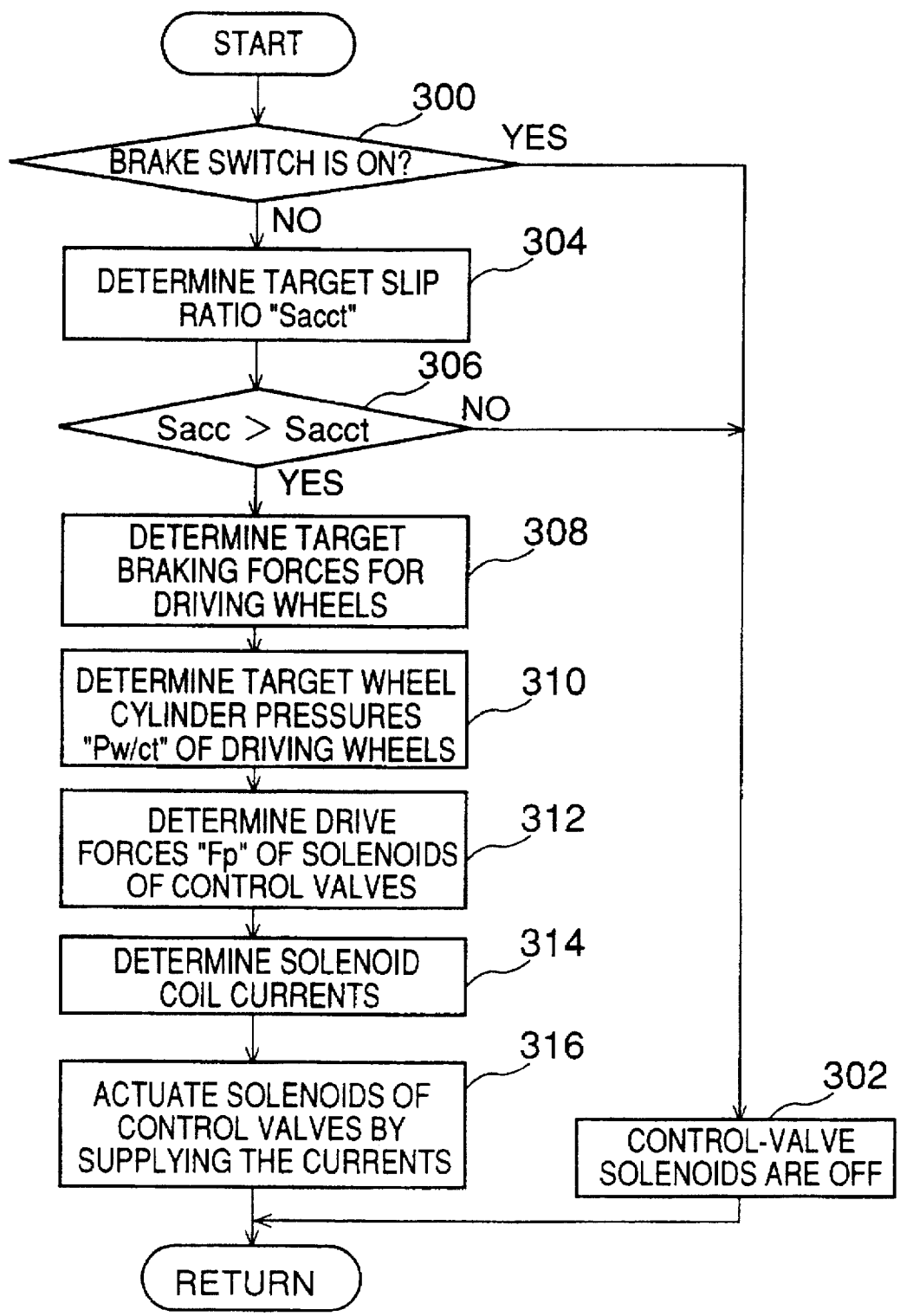
FIG. 5 is a flowchart for explaining a traction control (TRC) routine executed by the electronic control unit in FIG. 1.

FIG. 5 shows a traction control (TRC) routine executed by the electronic control unit in FIG. 1. Similarly to the control routine in FIG. 3, the execution of the control routine in FIG. 5 is repeatedly started at intervals of a predetermined time by using periodic interrupts.

When the TRC control routine in FIG. 5 is started, the ECU 10 at step 300 detects whether an ON signal is output by the brake switch 13 to the ECU 10.

When the result at the step 300 is affirmative, it is determined that the brake pedal 12 is depressed and the vehicle is not accelerating. That is, no slippage of the driving wheels due to the driving force which is excessively high may take place. Step 302 sets the control-valve solenoids 70 in OFF state. The ECU 10 at this time does not supply drive signals to the solenoids 70 of the control valves 26. After the step 102 is performed, the control routine at the present cycle ends.

On the other hand, when the result at the step 300 is negative, it is determined that the brake pedal 12 is released and the vehicle is running at a constant speed or accelerating. Step 304 determines a target slip ratio "Sacct" of the wheels based on the estimated vehicle speed VS0 (which is generated in another control routine) and the wheel speeds Vw (indicated by the signals from the wheel speed sensors 82). The target slip ratio "Sacct" generated at the step 104 is a maximum slip ratio that can maintain appropriate grip conditions of the tires of the vehicle when accelerating.

After the step 304 is performed, step 306 detects whether the slip ratio "Sacc" of each of the front-right wheel and the front-left wheel (the driving wheels) is greater than the target slip ratio "Sbrkt" generated at the step 304.

When the result at the step 306 is negative (Sacc≦Sacct), it is determined that the grip condition of each of the tires (for the driving wheels) does not exceed its critical level. That is, no slippage of the driving wheels has occurred. At this time, the above step 302 is performed, and then the control routine at the present cycle ends.

When the result at the step 306 is affirmative (Sacc>Sacct), it is determined that the grip conditions of any of the tires (for the driving wheels) exceed the critical level. The ECU 10 at this time determines that the present operating condition of the vehicle meets the TRC control execution condition, and the control is transferred to step 308.

Step 308 determines target braking forces for the driving wheels. The target braking forces generated at the step 110 are values that allow the slip ratio Sacc of each of the driving wheels to be reduced to the target slip ratio Sacct.

After the step 308 is performed, step 310 determines target wheel cylinder pressures "Pw/ct" for the wheel cylinders 18FL and 18FR based on the target braking forces at the step 308. The target wheel cylinder pressures Pw/ct generated at the step 310 are values that make the wheel cylinder pressure Pw/c applied to the wheel cylinders 18FL and 18FR appropriate for the target braking forces for the driving wheels.

After the step 310 is performed, step 312 determines driving forces "Fp" for the solenoids 70 of the control valves 26 based on the target wheel cylinder pressures Pw/ct for the wheel cylinders 18FL and 8FR, in accordance with the above Equation (2).

After the step 312 is performed, step 314 determines electric currents "I" which are supplied to the solenoid coils 66 of the solenoids 70 in order to produce the driving forces "Fp" at the solenoids 70.

After the step 314 is performed, step 316 actuates the solenoids 70 of the control valves 26 by supplying the current I to the corresponding solenoid coil 66 of each solenoid 70. The control valves 26 are controlled by the ECU 10 so that the control valves 26 are in appropriate conditions. After the step 316 is performed, the control routine at the present cycle ends.

In the above-described control routine, when the ON signal is not output by the brake switch 13, the steps 304 through 316 are performed. When the ON signal is not output by the brake switch 13, the brake pedal 12 is released and the master cylinder pressure Pm/c is equal to the atmospheric pressure. Thus, the driving force Fm/c on the spool 72 due to the master cylinder pressure Pm/c is set at zero. Therefore, the target wheel cylinder pressures Pw/ct (generated at the step 310) can be accurately generated by supplying the current I (generated at the step 314) to the solenoid 70 of each control valve 26.

Figure 6:
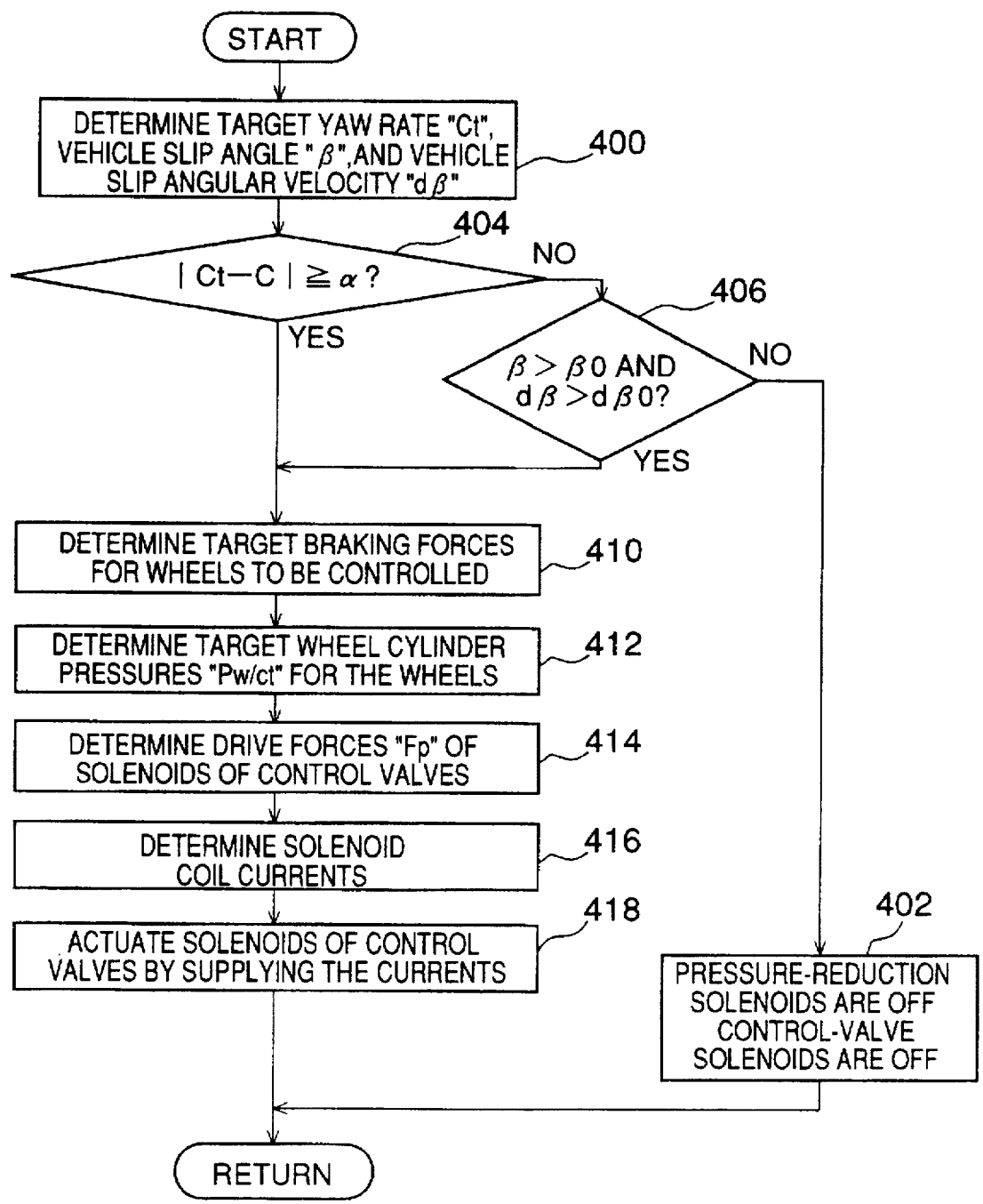
FIG. 6 is a flowchart for explaining a vehicle stability control (VSC) routine executed by the electronic control unit in FIG. 1.

FIG. 6 shows a vehicle stability control (VSC) routine executed by the ECU 10 of the hydraulic brake apparatus in FIG. 1. Similarly to the control routine in FIG. 3, the execution of the control routine in FIG. 6 is repeatedly started at intervals of a predetermined time by using periodic interrupts.

When the VSC control routine in FIG. 6 is started, the ECU 10 at step 400 determines a target yaw rate "Ct", a vehicle slip angle "β" and a vehicle slip angular velocity "dβ" based on the detection signals output from the yaw rate sensor 86, the lateral acceleration sensor 88 and the steering angle sensor 90.

After the step 400 is performed, step 404 detects whether the absolute value of a difference between the target yaw rate "Ct" (generated at the step 400) and the detected yaw rate "C" (detected by the yaw rate sensor 86) is above a reference value "α". If the absolute value |Ct−C| of the difference is above the reference value α, the ECU 10 determines that the vehicle is presently in under-steer state and performing the VSC control is required. At this time, the control is transferred to step 410 which will be described later.

When the result at the step 404 is negative (|Ct−C|<α), the control is transferred to step 406. Step 406 detects whether the vehicle slip angle "β" is above a reference angle "βo" and the vehicle slip angular velocity dβ is above a reference velocity "dβo". If the conditions: β>βo and dβ>dβo are met, it is determined that the vehicle is presently in over-steer state and performing the VSC control is required. At this time, the control is transferred to step 410.

Step 410 determines target braking forces of the wheels to be controlled. Step 412 determines target wheel cylinder pressures "Pw/ct" for the wheels based on the target braking forces at the step 410. Step 414 determines driving forces "Fp" for the solenoids 70 of the control valves 26 based on the target wheel cylinder pressures "Pw/ct" at the step 412, in accordance with the above Equation (2). Step 416 determines electric currents "I" which are supplied to the solenoid coils 66 of the solenoids 70 in order to produce the driving forces "Fp" at the solenoids 70. Step 418 actuates the solenoids 70 of the control valves 26 by supplying the current I to the corresponding solenoid coil 66 of each solenoid 70. The control valves 26 are thus controlled by the ECU 10 at the step 418 so that the control valves 26 are in appropriate conditions. After the step 418 is performed, the control routine at the present cycle ends.

On the other hand, when the result at the step 406 is negative, it is determined that the vehicle is presently neither in under-steer state nor in over-steer state, and performing the VSC control is not required. At this time, the control is transferred to step 402. Step 402 sets the pressure-reduction solenoids 24 in OFF state and sets the control-valve solenoids 70 in OFF state. The ECU 10 at this time does not supply drive signals to the pressure-reduction solenoids 24 nor to the solenoids 70 of the control valves 26. Since the brake fluid at the port 48 of each control valve 26 is subjected to the master cylinder pressure Pm/c and the driving force Fp due to the actuating force of each solenoid 70 is set at zero, the hydraulic brake apparatus of the present embodiment generates a wheel cylinder pressure that is equal to the master cylinder pressure multiplied by the given coefficient. After the step 402 is performed, the control routine at the present cycle ends.

In the above-described VSC control routine, when the vehicle is detected to be in under-steer state, the braking force exerted on the rear wheels of the vehicle is generated by the hydraulic brake apparatus so as to eliminate the under-steer state of the vehicle. When the vehicle is detected to be in over-steer state, the braking force exerted on an outside front wheel of the vehicle with respect to a turning circle is generated by the hydraulic brake apparatus so as to the over-steer state of the vehicle. In addition, the target braking forces for the wheels to be controlled are determined at the step 410 based on the degree of the under-steer state or the over-steer state.

In the above-described VSC control routine, when the VSC execution condition is met, the VSC control is accomplished by controlling the linear solenoids 70 of the control valves 26 by the current I supplied to the solenoid coil 66 of each solenoid 70. The hydraulic brake apparatus of the present embodiment provides a simple, inexpensive construction and provide an effective VSC control in comparison with a conventional brake apparatus which accomplishes the VSC control using the expensive force motor.

Figure 7:
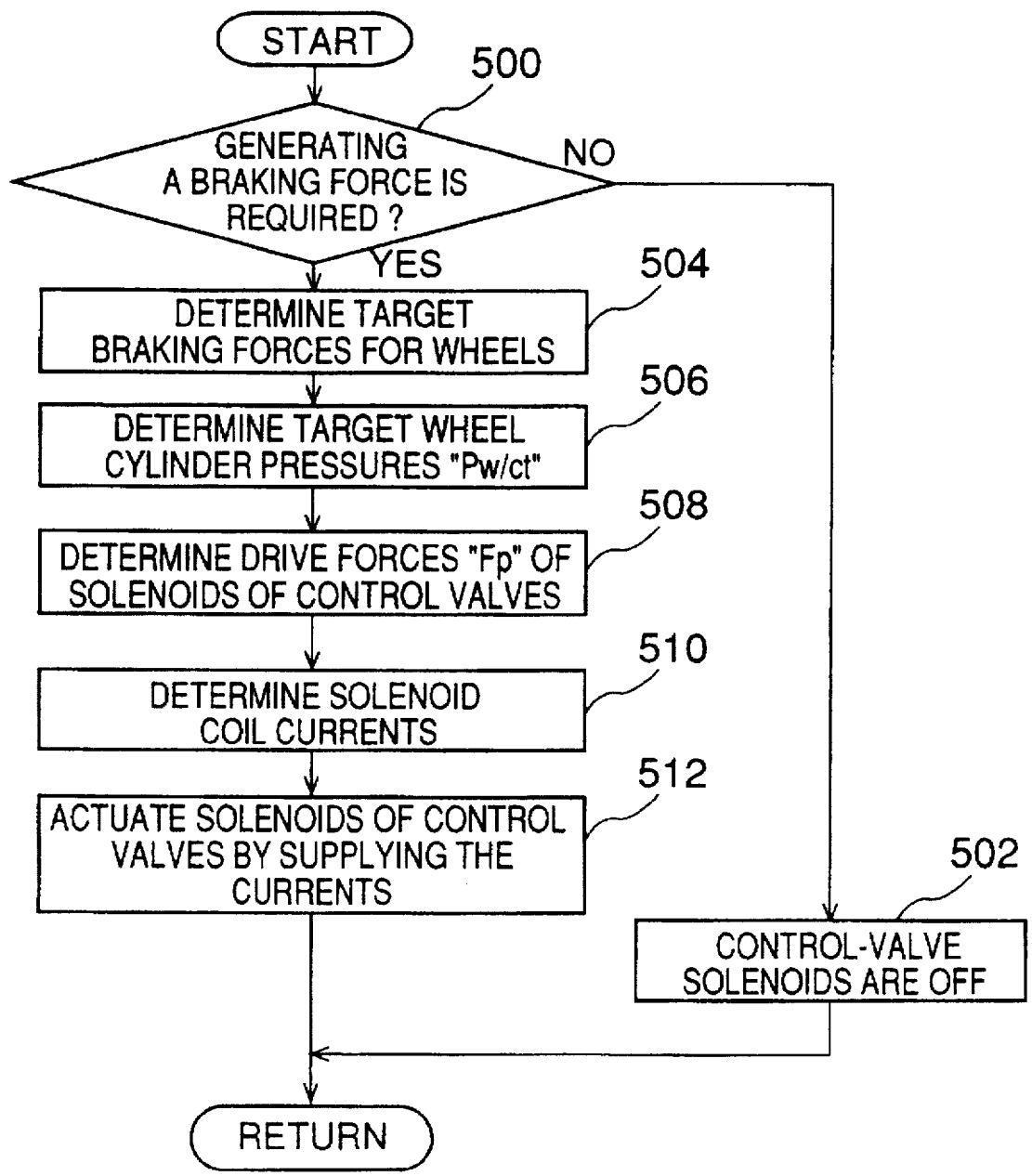
FIG. 7 is a flowchart for explaining an automatic braking control routine executed by the electronic control unit in FIG. 1.

FIG. 7 shows an automatic braking control routine executed by the ECU 10 of the hydraulic brake apparatus in FIG. 1. Similarly to the control routine in FIG. 3, the execution of the control routine in FIG. 7 is repeatedly started at intervals of a predetermined time by using periodic interrupts.

When the control routine in FIG. 7 is started, the ECU 10 at step 500 detects whether generating a braking force is required based on the detection signal output from the front monitoring unit 84 and based on the signal output from the brake switch 13. In the present embodiment, in a case in which the relative distance of an obstacle or an advancing vehicle to the vehicle is small, the relative velocity of the obstacle or the advancing vehicle to the vehicle speed is above a reference value, and the ON signal is not yet output by the brake switch 13, the ECU 10 determines that generating a braking force is required.

When the result at the step 500 is negative, step 502 is performed. Step 502 sets the control-valve solenoids 70 in OFF state. The ECU 10 at this time does not supply drive signals to the solenoids 70 of the control valves 26. Since the brake fluid at the port 48 of each control valve 26 is subjected to the master cylinder pressure Pm/c and the driving force Fp due to the actuating force of each solenoid 70 is set at zero, the hydraulic brake apparatus of the present embodiment generates a wheel cylinder pressure that is equal to the master cylinder pressure multiplied by the given coefficient. After the step 502 is performed, the control routine at the present cycle ends.

On the other hand, when the result at the step 500 is affirmative, steps 504 through 512 are performed. Step 504 determines target braking forces of the wheels. Step 506 determines target wheel cylinder pressures "Pw/ct" for the wheel cylinders 18 based on the target braking forces of the wheels. Step 508 determines driving forces "Fp" for the solenoids 70 of the control valves 26 based on the target wheel cylinder pressures Pw/ct for all the wheel cylinders 18, in accordance with the above Equation (2). Step 510 determines electric currents "I" which are supplied to the solenoid coils 66 of the solenoids 70 in order to produce the driving forces "Fp" at the solenoids 70. Step 512 actuates the solenoids 70 of the control valves 26 by supplying the current I to the corresponding solenoid coil 66 of each solenoid 70. The control valves 26 are thus controlled by the ECU 10 at the step 512 so that the control valves 26 are in appropriate conditions. After the step 512 is performed, the control routine at the present cycle ends.

As described above, the hydraulic brake apparatus of the present embodiment is capable of accomplishing the ABS control, the TRC control, the VSC control or the automatic braking control, when an operating condition of the vehicle meets any of the ABS control execution condition, the TRC execution condition, the VSC execution condition and the automatic braking control execution condition. Therefore, the hydraulic brake apparatus of the present embodiment can provide a simple, inexpensive construction and provide an effective control of the master cylinder pressure on the spool and the wheel cylinder pressure on the spool in comparison with a conventional brake apparatus which cannot reduce the master cylinder pressure on the spool without using the expensive force motor.

Figure 8:
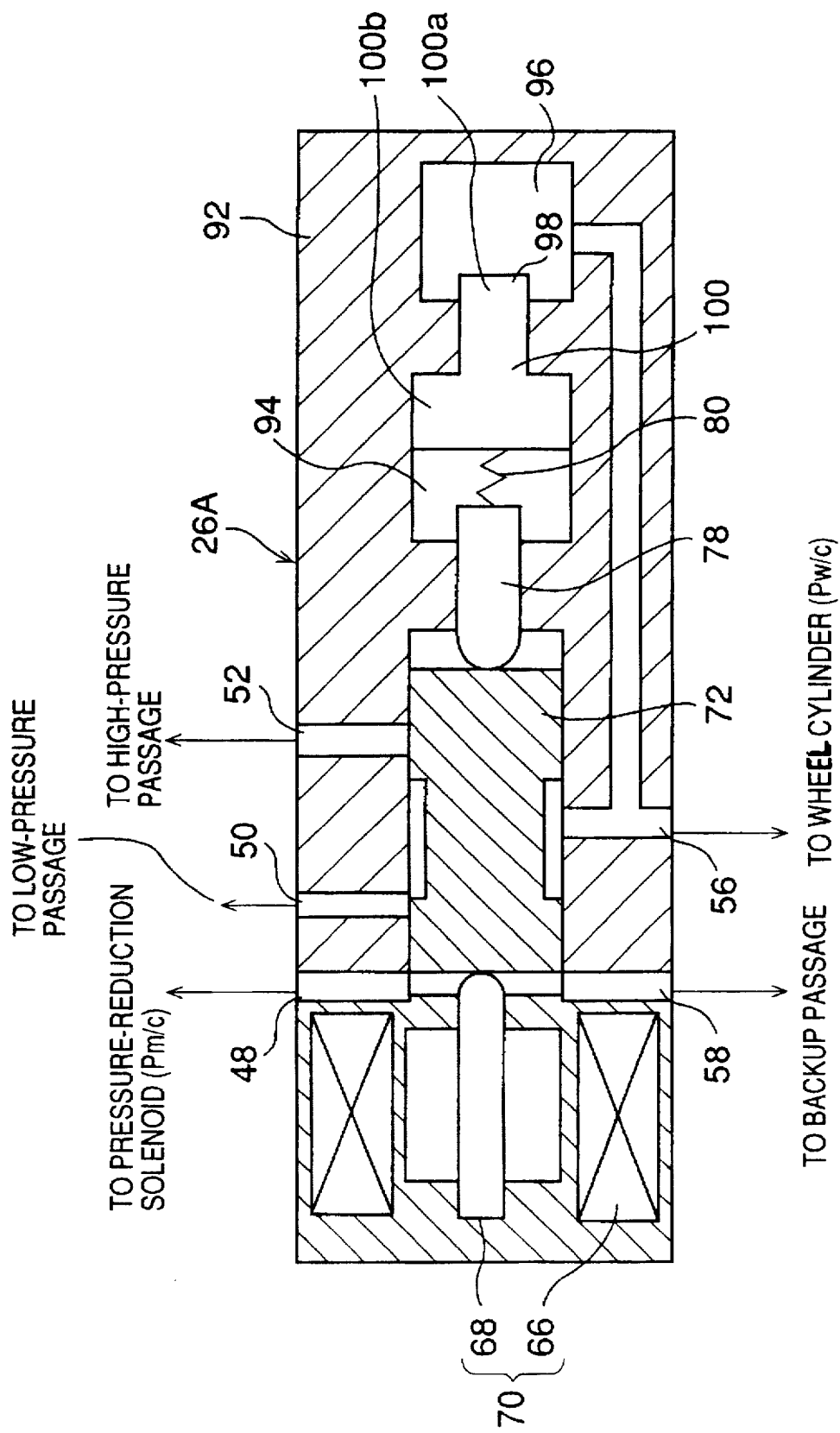
FIG. 8 is a cross-sectional view of another control valve for use in the hydraulic brake apparatus in FIG. 1.

Next, FIG. 8 shows another control valve for use in the hydraulic brake apparatus in FIG. 1. In FIG. 8, the elements which are the same as corresponding elements in FIG. 2 are designated by the same reference numerals, and a description thereof will be omitted.

Referring to FIG. 8, a control valve 26A has a housing 92 in which a first reaction chamber 94 and a second reaction chamber 96 are provided. The reaction pin 78 and the spring 80 are arranged in the first reaction chamber 94. The first reaction chamber 94 is isolated from the control pressure outlet port 56. The second reaction chamber 96 is open to the control pressure outlet port 56, and the brake fluid within the second reaction chamber 94 is always subjected to the wheel cylinder pressure Pw/c at the outlet port 56.

The first reaction chamber 94 and the second reaction chamber 96 communicate with each other via a through-hole 96 formed therebetween. A step piston 100 is arranged on the through-hole 96 between the first reaction chamber 94 and the second reaction chamber 96. The step piston 100 is movable in a longitudinal axial direction on the through-hole 98 and tightly supported by the internal wall of the housing 92.

The step piston 100 includes a small-diameter portion 100a and a large-diameter portion 100b. The spring 80 which provides a biasing force to push the reaction pin 78 toward the spool 72 is connected to the large-diameter portion 100b. One end of the small-diameter portion 100a internally projects to the inside of the second reaction chamber 96.

When brake fluid from the corresponding wheel cylinder 18 is introduced from the port 56 into the second reaction chamber 96, a reaction force due to the wheel cylinder pressure Pw/c is transmitted from the step piston 100 to the spool 72 through the spring 80 and the reaction pin 78.

In the step piston 100 of the present embodiment, the small-diameter portion 100a has a cross-sectional area that is smaller than the cross-sectional area of the reaction pin 78. Thus, the reaction force exerted on the spool 72 in the control valve 26A in FIG. 8 is smaller than that in the control valve 26 in FIG. 2. For this reason, the control valve 26A of the present embodiment can more effectively exert the wheel cylinder pressure Pw/c on the spool 72 by generating a small driving force Fp due to the actuating force of the solenoid 70 in comparison with the control valve 26 in FIG. 2.

Figure 9:
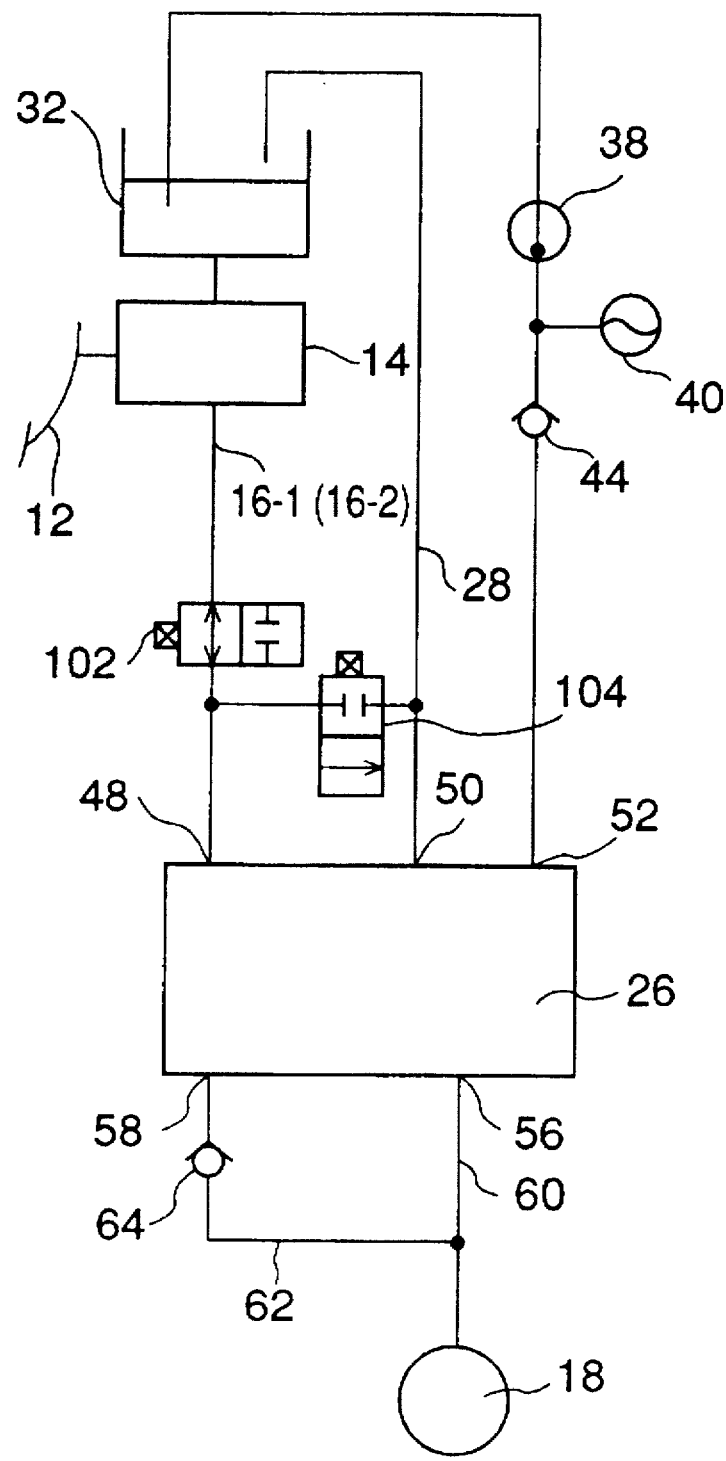
FIG. 9 is a system block diagram partially showing a hydraulic brake apparatus to which another embodiment of the present invention is applied.

Next, FIG. 9 shows a hydraulic brake apparatus to which another embodiment of the present invention is applied. For the sake of convenience, only a partial construction of the hydraulic brake apparatus of the present embodiment which corresponds to one of the four wheels of the vehicle is shown in FIG. 9.

In FIG. 9, the elements which are the same as corresponding elements shown in FIG. 1 are designated by the same reference numerals, and a description thereof will be omitted.

Referring to FIG. 9, the hydraulic brake apparatus of the present embodiment includes a first pressure-reduction solenoid 102 and a second pressure-reduction solenoid 104, instead of one of the pressure-reduction solenoids 24 shown in FIG. 1.

As shown in FIG. 9, the first pressure-reduction solenoid 102 is provided at an intermediate portion of the master-cylinder passage 16-1 or 16-2 between the master cylinder 14 and the port 48 of the control valve 26. The second pressure-reduction solenoid 104 is provided on a passage between the master-cylinder passage 16-1 or 16-2 (at the port 48 of the control valve 26) and the low-pressure passage 28.

Each of the first and second pressure-reduction solenoids 102 and 104 is a two-position solenoid valve having one inlet port and one outlet port. Each of the first and second pressure-reduction solenoids 102 and 104 is operated in response to a drive signal output from the ECU 10. The outlet port of the solenoid 102 is connected to the inlet port of the solenoid 104 and to the port 48 of the control valve 26. The outlet port of the solenoid 104 is connected to the low-pressure passage 28.

When no drive signal is supplied to the first pressure-reduction solenoid 102, the solenoid 102 passes the brake fluid from its inlet port to its outlet port. When the drive signal from the ECU 10 is supplied to the solenoid 102, the solenoid 102 closes the inlet port and the outlet port.

On the other hand, when no drive signal is supplied to the second pressure-reduction solenoid 104, the solenoid 104 closes its inlet port and its outlet port. When the drive signal from the ECU 10 is supplied to the solenoid 104, the solenoid 104 passes the brake fluid from the inlet port to the outlet port.

In the present embodiment, when the ABS control execution condition or the VSC execution condition is met, the ECU 10 simultaneously supplies the drive signal to both the first pressure-reduction solenoid 102 and the second pressure-reduction solenoid 104. At this time, the master cylinder 14 is isolated from the control valve 26 by the solenoid 102 (which is set at the closed position), and the port 48 of the control valve 26 is connected to the low-pressure passage 28 via the solenoid 104 (which is set at the open position). Accordingly, the hydraulic brake apparatus of the present embodiment provides the same function as that of the previous embodiment in FIG. 2 when the drive signal from the ECU 10 is supplied to the pressure-reduction solenoids 24.

Although the pressure-reduction solenoids 24 of the previous embodiment in FIG. 1 are constructed by using the three-way solenoid valve, the present invention is not limited to this embodiment. As described above, the function of the hydraulic brake apparatus of the previous embodiment in FIG. 2 when the drive signal from the ECU 10 is supplied to the pressure-reduction solenoids 24 may be accomplished by the hydraulic brake apparatus of the present embodiment in FIG. 9 which uses the two two-way solenoid valves instead of the three-way solenoid valve.

Further, the present invention is not limited to the above-described embodiments, and variations and modifications may be made without departing from the scope of the present invention.

What is claimed is:

1. A hydraulic brake apparatus comprising:

control valve means having a spool which is bi-directionally movable between a first position and a second position, said spool, when located at the first position, allowing brake fluid from a low-pressure source to pass through the control valve means to a wheel cylinder, and said spool, when located at the second position, allowing brake fluid from a high-pressure source to pass through the control valve means to the wheel cylinder;

first means for introducing brake fluid from the wheel cylinder into the control valve means, said brake fluid having a wheel cylinder pressure exerted to move the spool in a first direction toward the first position;

second means for introducing brake fluid from a master cylinder into the control valve means, said brake fluid having a master cylinder pressure exerted to move the spool in a second, reverse direction toward the second position; and third means for reducing the master cylinder pressure exerted on the spool.

2. The apparatus according to claim 1, wherein said third means inhibits flowing out of brake fluid from the master cylinder to the low-pressure source simultaneously when the master cylinder pressure exerted on the spool is reduced.

3. The apparatus according to claim 1, further comprising:

means for controlling a driving force exerted to move the spool in the second direction when an anti-lock brake system control execution condition is met, said driving force setting the wheel cylinder pressure on the spool at a target wheel cylinder pressure; and means for generating a target wheel cylinder pressure immediately after the anti-lock brake system control execution condition is met, based on the wheel cylinder pressure immediately before the anti-lock brake system control execution condition is met.

4. The apparatus according to claim 1, wherein said first means includes an outlet port which is open to the wheel cylinder, and a reaction chamber which is open to said outlet port.

5. The apparatus according to claim 1, wherein said second means includes an inlet port which is open to a master cylinder passage, and a master cylinder pressure cavity which is open to said inlet port.

6. The apparatus according to claim 1, wherein said third means comprises a three-way solenoid valve which has an inlet port connected to a master cylinder passage, an outlet port connected to a port of the control valve means, and an outlet port connected to a low-pressure passage.

7. The apparatus according to claim 1, wherein said third means comprises a plurality of two-way solenoid valves which are connected such that the solenoid valves include an inlet port connected to a master cylinder passage, and an outlet port connected to a port of the control valve means.

8. The apparatus according to claim 1, wherein said control valve means comprises a linear solenoid which generates a driving force exerted on the spool in the second direction only in response to a drive signal.

9. The apparatus according to claim 8, wherein said linear solenoid is actuated to generate a driving force exerted on the spool in the second direction when an anti-lock brake system control execution condition is met, and said linear solenoid is set in OFF state when the anti-lock brake system control execution condition is not met.

10. The apparatus according to claim 1, wherein said control valve means includes a plurality of reaction chambers, a reaction pin connected to the spool, and a step piston provided in the plurality of reaction chambers and connected to the reaction pin, said step piston having a cross-sectional area smaller than a cross-sectional area of said reaction pin.

11. The apparatus according to claim 1, wherein said third means inhibits the introduction of brake fluid from the master cylinder into the control valve means so that the master cylinder pressure exerted on the spool is reduced.

* * * * *